(12) United States Patent
Dementhon et al.

(10) Patent No.: US 9,878,917 B2
(45) Date of Patent: Jan. 30, 2018

(54) AMMONIA STORAGE STRUCTURE AND ASSOCIATED SYSTEMS AND METHOD

(71) Applicant: AAQIUS & AAQIUS SA, Geneva (CH)

(72) Inventors: Jean-Baptiste Dementhon, Paris (FR); Michael Francis Levy, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 0 days.

(21) Appl. No.: 14/419,928

(22) PCT Filed: Aug. 9, 2013

(86) PCT No.: PCT/EP2013/066768
§ 371 (c)(1),
(2) Date: Feb. 5, 2015

(87) PCT Pub. No.: WO2014/023840
PCT Pub. Date: Feb. 13, 2014

(65) Prior Publication Data
US 2015/0183648 A1      Jul. 2, 2015

(30) Foreign Application Priority Data

Aug. 9, 2012   (EP) ..................................... 12305993

(51) Int. Cl.
*F01N 3/20*      (2006.01)
*C01C 1/00*      (2006.01)
(Continued)

(52) U.S. Cl.
CPC .......... *C01C 1/006* (2013.01); *B65D 81/3823* (2013.01); *F01N 3/2066* (2013.01);
(Continued)

(58) Field of Classification Search
CPC .. F01N 3/208; F01N 2610/02; F01N 2610/06; F01N 2610/105; F01N 2610/1413; F01N 2610/1453
(Continued)

(56) References Cited

U.S. PATENT DOCUMENTS

| 4,134,491 A | 1/1979 | Turillon et al. |
| 4,598,836 A | 7/1986 | Wessel |

(Continued)

FOREIGN PATENT DOCUMENTS

| CN | 101678275 | 3/2010 |
| DE | 10 2008 002 338 A1 | 12/2009 |

(Continued)

OTHER PUBLICATIONS

Han, J.H., et al., "Gas Permeability of Expanded Graphite-Metallic Salt Composite," *Applied Thermal Engineering*, vol. 21, No. 4, Mar. 1, 2001, XP002620755, pp. 453-463.

*Primary Examiner* — Jorge Leon, Jr.
(74) *Attorney, Agent, or Firm* — Blakely Sokoloff Taylor & Zafman LLP

(57) ABSTRACT

Ammonia storage structure, characterized in that it comprises an alternation:—of at least one ammonia storage layer, and—of at least one layer of a thermally conductive material of a thermal conductivity higher than that of the storage layer, the at least one layer of thermally conductive material being intended to increase heat transfers within the structure.

36 Claims, 4 Drawing Sheets

(51) Int. Cl.
  *B65D 81/38* (2006.01)
  *F01N 3/24* (2006.01)

(52) U.S. Cl.
  CPC .............. *F01N 3/24* (2013.01); *F01N 3/208* (2013.01); *F01N 2610/02* (2013.01); *F01N 2610/06* (2013.01); *F01N 2610/10* (2013.01); *F01N 2610/105* (2013.01); *F01N 2610/1406* (2013.01); *F01N 2610/1413* (2013.01); *F01N 2610/1453* (2013.01); *Y02T 10/24* (2013.01); *Y10T 156/10* (2015.01)

(58) Field of Classification Search
  USPC .................................. 60/274, 286, 295, 301
  See application file for complete search history.

(56) References Cited

U.S. PATENT DOCUMENTS

| | | | |
|---|---|---|---|
| 2009/0280047 A1* | 11/2009 | Christensen | B01D 53/90 423/239.1 |
| 2010/0021780 A1* | 1/2010 | Johannessen | B01D 53/8631 429/421 |
| 2011/0073806 A1* | 3/2011 | Svagin | B01J 20/046 252/193 |
| 2011/0218095 A1* | 9/2011 | Quaade | B01D 53/9481 502/1 |
| 2011/0280768 A1* | 11/2011 | Kawasaki | B01D 53/90 422/111 |
| 2013/0327021 A1* | 12/2013 | Greber | F01N 3/2066 60/274 |
| 2014/0271389 A1* | 9/2014 | Yezerets | B01D 53/90 422/173 |

FOREIGN PATENT DOCUMENTS

| | | |
|---|---|---|
| EP | 1 977 817 A1 | 10/2008 |
| EP | 2 386 523 A1 | 11/2011 |
| EP | 2 428 490 A1 | 3/2012 |
| JP | A-1992504224 | 7/1992 |
| JP | 06-158194 | 6/1994 |
| WO | WO 9010491 A1 | 9/1990 |
| WO | WO 2009149982 A2 * 12/2009 ............... B01J 7/00 |
| WO | WO 2010/025948 A1 | 3/2010 |
| WO | WO 2011/038916 A1 | 4/2011 |
| WO | WO 2011/119735 A1 | 9/2011 |
| WO | WO 2012/001331 A1 | 1/2012 |

* cited by examiner

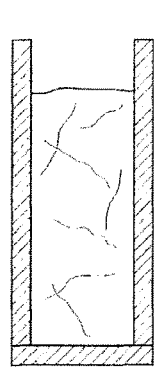 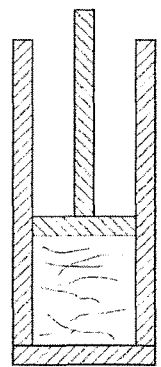 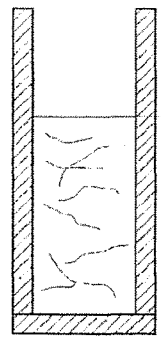 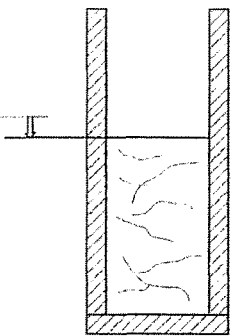
FIG. 3a  FIG. 3b  FIG. 3c  FIG. 3d
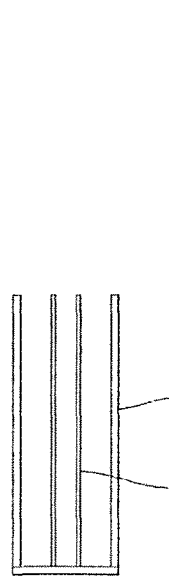 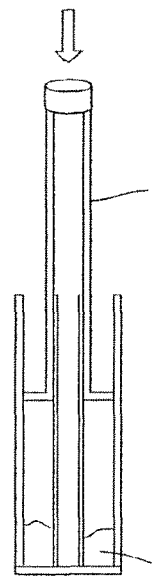 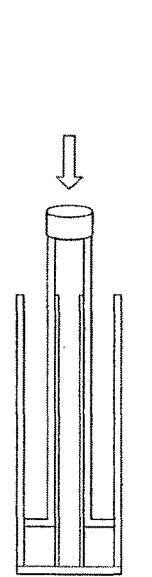 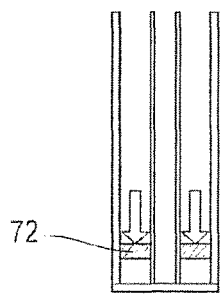
FIG. 4a  FIG. 4b  FIG. 4c  FIG. 4d

AMMONIA STORAGE STRUCTURE AND ASSOCIATED SYSTEMS AND METHOD

FIELD OF THE INVENTION

The invention relates generally to ammonia storage in applications involving nitrogen oxide $NO_x$ reduction by selective catalytic reduction (SCR), particularly for reducing pollutant emissions by internal-combustion engines, particularly diesel engines.

STATE OF THE ART

Pollutant emissions connected with transportation have for nearly thirty years been a primary progress driver in industry. The gradual increase in severity of emissions limits for the four regulated pollutants (CO, HC, $NO_x$, particulates) had made it possible to significantly improve air quality, particularly in large cities.

The constantly increasing use of the automobile makes it necessary to continue efforts to further reduce these pollutant emissions. A reduction in tolerance with respect to European emissions thresholds is expected in 2014 within the scope of entry into force of the Euro6 standard. Such measures aim to reduce local pollution. Having pollution control technologies that are highly effective under all driving conditions is thus a major challenge for the transportation industry. In this context, reduction of nitrogen oxides ($NO_x$) in a lean mixture, that is in a mixture including an excess of oxygen, represents an important challenge associated with a complex problem set.

Moreover, fuel consumption, directly connected with $CO_2$ emissions, has been driven in a few years to the level of a major preoccupation of the automobile industry. Thus, regulations were put in place at the European level, starting in 2012, regarding $CO_2$ emissions of private vehicles. It is already certain that this limit will be regularly lowered over the coming decades. Reduction of $CO_2$ emissions has thus prevailed as the new growth driver for the entire transportation industry.

This dual problem set, reduction in local pollution ($NO_x$) and reducing fuel consumption ($CO_2$) is particularly difficult for the diesel engine, the lean-mixture combustion whereof is accompanied by $NO_x$ emissions that are difficult to treat.

In this context, SCR (selective catalytic reduction) post-treatment technology is used both for private vehicles and for vehicles assigned to transporting freight. It is then possible to position the engine at its optimal efficiency, the strong NOx emissions then being treated in the exhaust by the SCR system, allowing highly effective NOx reduction.

To allow such an SCR technology to be set up, it is necessary to place on board the vehicle a reducing agent needed for reducing the nitrogen oxides. The system currently in used by heavy vehicles uses urea in aqueous solution as the reducing agent. Injected into the exhaust, the urea decomposes into ammonia ($NH_3$) under the influence of the exhaust gas temperature into and allow reduction of the $NO_x$ on a specific catalyst. One aqueous urea solution used and standardized for currently mass-produced SCR systems is referred to in AUS32 (the trade name in Europe being Adblue®)

This very effective process suffers, however, from a certain number of shortcomings. It exhibits limited effectiveness under cold conditions, yet this situation presents itself in many cases, particularly that of city buses. The urea reservoir exhibits considerable mass and volume, typically 15 to 30 L for a private vehicle, 40 to 80 L for a heavy vehicle. Such bulk brings about complexity in integration into a vehicle that is all the greater when the vehicle is smaller. The result is a high cost of pollution control, as well as excess mass that is detrimental to the fuel consumption of the vehicle, and hence to $CO_2$ emissions.

Various alternative storage methods have been contemplated. The option of storing ammonia as a gas under pressure has many shortcomings in terms of compactness and operating safety.

A preferred method consists of absorption of the gas into a material, a salt for example, placed in a storage container. Ammonia storage is then accomplished inside the salt by formation of an ammoniate type chemical complex. The advantages of this type of storage compared with urea in aqueous solution are numerous. Storage within a salt allows a significant reduction in mass and in volume of the storage reservoir. It also allows a benefit in terms of $CO_2$ count due to reduction of the mass to be carried on-board for a given ammonia endurance. Indeed, the additional water provided for diluting the urea in the conventional, or liquid, SCR configuration is saved. Moreover, this type of storage allows implementation of NOx absorption under cold conditions with greater effectiveness. This type of storage also provides a reduction in manufacturing costs, because the ammonia feed and injection system can be simplified.

To limit the bulk of the storage container, automobile builders favor filling or replacement of the storage container, for example during engine maintenance, during an oil change or during filling of the fuel tank. The quantity of ammonia carried on board a private vehicle will be on the order of 6 kg, equivalent to 16 L of AUS32 type urea solution, which makes it possible to provide endurance for the private vehicle between two oil change intervals of the vehicle. To supply the system with ammonia, a heating element, electrical or using a heat carrier fluid for example, controlled so as to meter, under every operating condition, the ammonia required for treating nitrogen oxides.

Once the storage container, a cartridge for example, is empty, it is replaced with a full one, for example during maintenance of the vehicle, the empty one being refurbished at a central filing point. A cartridge can thus undergo from ten to fifteen filling/withdrawal cycles.

To limit the average electrical power used to manage the removal of ammonia from storage, an additive can be resorted to that supplements the salt matrix, said additive having much higher thermal conductivity than the salt, which makes it possible to transfer heat from the heating member to the core of the storage material. This additive can typically be expanded natural graphite.

Moreover, the correct formulation of said additive has other virtues. First of all, its presence can make it possible to facilitate the ammonia filling phase during maintenance (shortened filling time). Finally, the presence of this additive can provide a benefit as regards the durability of the system, particularly during successive draining and filling cycles of the cartridge.

Indeed, during the absorption reaction, fixation of the gaseous ammonia by the solid salt constituting the storage material is accompanied by an increase in volume, the ammoniate then occupying a volume much larger than the volume of the pure salt. The volume of the salt after absorption can be up to five to six times greater than the volume of the salt without ammonia. The increase in volume of the salt is due not only to the dilation of the crystal lattice of the material, but also to its fragmentation, thus leaving free space between the micro-crystals of the ammoniate complex. The successive dilation and contraction phases of the porous matrix can thus case local fretting phenomena, which has a negative effect on the homogeneity of the porosity, and generally on the durability of the material.

Achieving an optimum mixture of the storage phase (salt) and the additive is thus one of the keys to implementing the system. A known technique for achieving such a mixture consists of obtaining the link between the storage phase and the additive via a methanol bath. The method, extrapolated to the scale of automobile mass production, has proven complex and costly in investment, due to the involvement of an intermediary product, methanol in this case, and numerous supplementary manufacturing steps, such as preparation of the methanol bath, creation of thermodynamic conditions for mixing the two products in the desire proportion, drying the assembly and conditioning the matrix thus obtained.

SUMMARY OF THE INVENTION

One aim of the invention is to provide a structure and a means of producing a matrix designed for storing ammonia, including a material designed for the actual storage by absorption, which allows operation and greater effectiveness.

To this end, an ammonia storage structure is provided, wherein it includes in alternation:
- at least one ammonia storage layer, and
- at least one layer of a thermally conductive material with a higher thermal conductivity than that of the storage layer, the or each layer of thermally conductive material being designed to increase heat transfer within the structure.

The invention is advantageously supplemented with the following features, taken alone or in any one of their technically possible combinations:
- the or each ammonia storage layer includes a powdered salt,
- the or each layer of thermally conductive material consist of a previously compressed powder,
- the at least one storage layer is a rigid wafer, compressed or not compressed,
- the number of thermally conductive layers,
- each intermediate layer is mechanically independent of the adjoining layer or of the other layers,
- each layer provides for total mutual separation between the two layers adjoining it.

The invention also relates to an ammonia storage and withdrawal system of a vehicle including a storage container, wherein the storage container includes a storage structure as previously described.

The invention is advantageously supplemented by the following features, taken alone or in any one of their technically possible combinations:
- the, or each layer of thermally conductive material is dimensioned with respect to the container to exhibit clearance between said layer and the wall of the container when the structure is not saturated with ammonia, so that an increase in the volume of the at least one storage layer by storing ammonia is compensated, in an initial filling phase, by a modification of the shape of the layer of thermally conductive material so as to occupy a free space resulting from the clearance,
- the clearance is situated between a sidewall of the container and a sidewall of the layer of thermally conductive material,
- the clearance is comprised between 2% and 30% of the transverse diameter of the layer of thermally conductive material,
- the storage structure is produced in such a manner that the or each layer of thermally conductive material is able to undergo compression in a final filling phase,
- each layer extends, in a given filling condition, generally over the entire extend of the cross-section of the container,
- the structure exhibits a hollow along the axis of axial symmetry to allow storage and/or withdrawal of ammonia at each storage layer,
- a device for heating the storage structure for withdrawing the ammonia stored in the structure, the heating device including several heating modules, each heating module being designed to heat one storage layer independently of other storage layers,
- the structure includes channels for carrying ammonia from outside the container to the one or more storage layers, and vice versa,
- an ammonia storage system as previously described, and a module for injecting ammonia into the exhaust gases.

The invention also relates to a method for obtaining an ammonia storage structure as previously described, the method including steps consisting of:
- depositing a storage layer including a non- or previously compressed salt,
- depositing a layer of a thermally conductive material having a higher thermal conductivity than that of the storage layer, consisting of a previously compressed powder, these two steps being repeated to form a structure having an alternation of storage layers and interspersed layer(s) of thermally conductive material.

The invention is advantageously supplemented by the following features, taken alone or in any one of their technical possible combinations:
- the deposition steps are accomplished inside a storage container,
- the introduction of the powdered salt into the container to form a layer and forming of this layer using a plunger,
- The storage layer and the layer of a thermally conductive material are pre-assembled, the two layers then being deposited simultaneously into the container,
- pre-assembly is accomplished by gluing and/or compression of the layers against one another.

BRIEF DESCRIPTION OF THE FIGURES

Other features, aims and advantages of the invention will appear upon reading the following description of one embodiment. In the appended drawings:

FIGS. 3a to 3d show the addition of powdered additives to a salt according to the prior art, FIGS. 4a to 4h show a method for producing the storage structure according to one embodiment of the invention.

DETAILED DESCRIPTION OF THE INVENTION

1) Known Chemisorption Properties of Ammonia in Salts a) Reaction

In a storage structure, a powdered salt is chosen from among the alkaline earth chlorides. In particular, the powdered salt is selected from among the following compounds: $SrCl_2$, $MgCl_2$, $BaCl_2$, $CaCl_2$, $NaCl_2$. Storage of ammonia relies in other respects on a reversible solid-gas reaction of the type:

<Solid A>+(Gas)⇌<Solid B>

Ammonia forms coordination complexes, also called ammoniates, with the alkali earth chlorides. This phenomenon is known to those skilled in the art.

For example, the reactions of ammonia with strontium chloride are:

$$SrCl_2(s)+NH_3(g) \leftrightharpoons Sr(NH_3)Cl_2(s)$$

$$Sr(NH_3)Cl_2(s)+7NH_3(g) \leftrightharpoons Sr(NH_3)_8Cl_2(s)$$

Likewise, the sole reaction of ammonia with barium chloride is:

$$BaCl_2(s)+8NH_3(g) \leftrightharpoons Ba(NH_3)_8Cl_2(s)$$

Chemical absorption of the ammonia ligand by the $SrCl_2$ and $BaCl_2$ absorbent brings about, between the solid and the gas, a transfer of electrons which is manifested by chemical bonds between $NH_3$ and the outer layer of $SrCl_2$ and $BaCl_2$ atoms, penetration of gas into the structure of the solid occurring in its entire mass by a process of diffusion. This reaction is completely reversible, the absorption being exothermic and the desorption endothermic.

b) Dilation

Figure 2A:
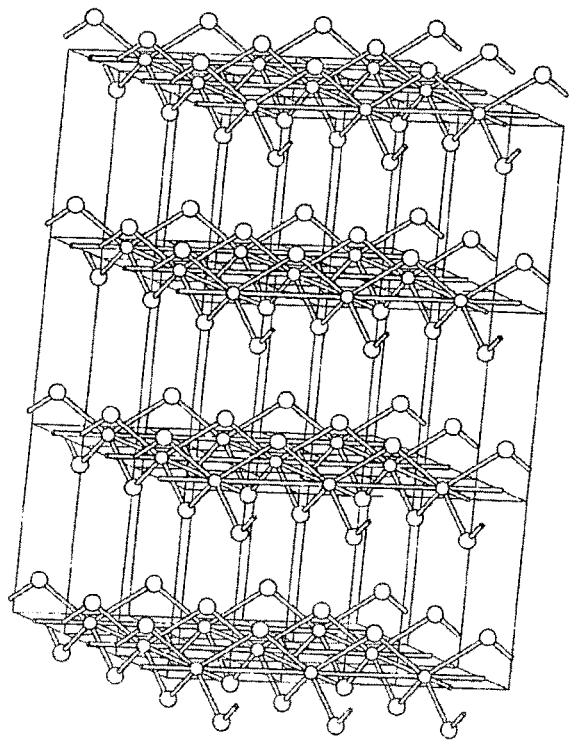
FIG. 2a shows the crystalline structure of a layer of $MgCl_2$ salt.
Figure 2B:
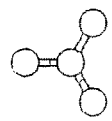
FIG. 2b shows an ammonia molecule.

With reference to FIGS. 2a to 2d, dilation resulting from the absorption phenomenon in the case of magnesium chloride salt is described. FIG. 2a shows the crystalline structure of a layer of $MgCl_2$ salt. FIG. 2b shows a molecule of ammonia.

Figure 2C:
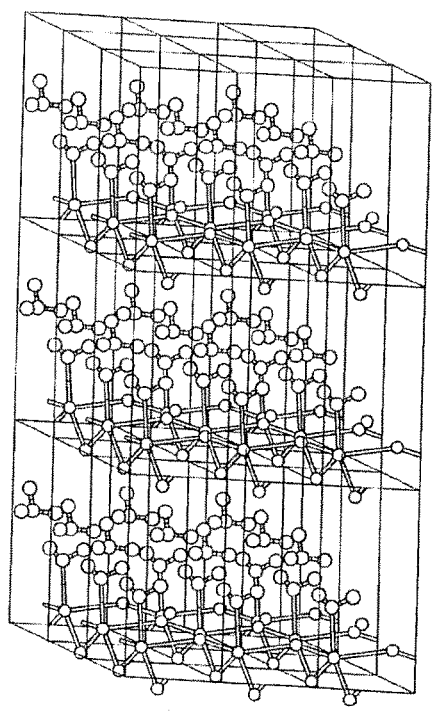
FIG. 2c shows the crystalline structure of $MgCl_2(NH_3)_2$, FIG. 2d [shows] the crystalline structure of $MgCl_2(NH_3)_6$.
Figure 2D:
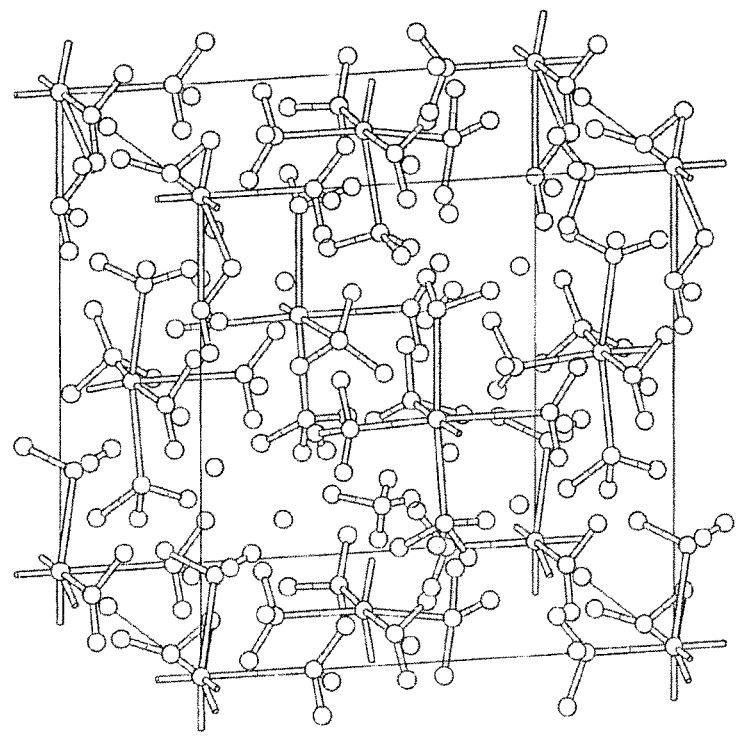

The reactions of ammonia with magnesium chloride have the form:

$$MgCl_2(s)+nNH_3(g) \leftrightharpoons MgCl_2(NH_3)_n(s)$$

Where n can have the value 2 or 6. Thus FIG. 2c shows the crystalline structure of $MgCl_2(NH_3)_2$ and FIG. 2d the crystalline structure of $MgCl_2(NH_3)_6$.

With reference to Table 1, the theoretical dilation factor between different pure salts and their associated pure complexes is shown. This value corresponds solely to the dilation of the crystal lattice, and does not include the dilation due to fragmentation of micro-crystals. The absorption enthalpy values at equilibrium at low pressure.

TABLE 1

| Molecular formula | Molecular mass (g/mol) | Density (kg/L) | Dilation factor | Absorption enthalpy (kJ/mol) | Absorption entropy (J/mol · K) |
|---|---|---|---|---|---|
| $(NH_2)_2CO^+H_2O$ | N/A | 1.086 | | 0.184 | 0.2 |
| $MgCl_2$ | 95.21 | 2.32 | | | |
| $Mg(NH_3)_6Cl_2$ | 197.39 | 1.16 | 2 | 55.7 | 230 |
| $SrCl_2$ | 158.53 | 3.05 | | | |
| $Sr(NH_3)_8Cl_2$ | 294.77 | 1.3 | 2.35 | 38.7 | 230 |
| $BaCl_2$ | 208.23 | 3.85 | | | |
| $Ba(NH_3)_8Cl_2$ | 344.37 | 1.7 | 2.26 | 41.4 | 230 |
| $NH_3$ | 17.03 | 0.61 | | | | c) Requirements for the Storage Structure

An ammonia storage structure must be able to provide several filling/withdrawal cycles over the life of the vehicle with which it is associated. These filling/withdrawal cycles give rise to phase changes in the ammonia. Withdrawal is triggered by elevation of the temperature of the structure, while filling, for its part, is provided for after connecting a container 8 to a pressurized ammonia supply circuit 200 and by a device for cooling the assembly, designed to remove the calories released during the change of phase of the ammonia.

In the case of absorption of the gas in a powdered salt, the gas diffuses through the porous salt medium of the storage structure, from the grain of salt to the outlet of the container, a cartridge for example, allowing provision of the ammonia to be injected into the exhaust.

During the conditioning and reconditioning phase of the container, ammonia is reintroduced into the system, diffuses within the porous medium created by the powdered salt and is absorbed within the grains of salt. The cycle of these transformations over time, or breathing of the material, must be able to be accomplished without deterioration of the storage capacity and with reasonable lifetimes. Heterogeneous compression gradients in the salt and fretting mechanisms can in fact degrade the storage structure.

During a desorption phase, pressurized gas should be available within a time compatible with regulations, which provide for measuring the effectiveness of the SCR system at various operating temperatures comprised between −15° C. and 25° C.

During an absorption phase corresponding to conditioning or reconditioning of the container 8, the time required for filling the cartridge should also be minimized so as to control the cost of the operation, whether it is initial manufacture of the cartridge or its recharging during the life of the vehicle.

d) Additives

With reference to FIGS. 3a to 3d, the addition of powdered additive to a salt according to the prior art is described. To improve the thermal conductivity, which leads to a reduction in the electrical power required to manage the assembly and to shortening the time needed to recharge the system, to maintain good durability of said matrix over the course of its successive dilations and contractions and to make the storage structure more robust, that is more able to be filled, the addition of various additives has been contemplated in the state of the art.

The additive can include expanded natural graphite, which can also be added to the salt prior to compaction.

The additive can include a metal powder, for example an aluminum powder.

Then, during desorption of the ammonia, the lattice created by the recompressed natural graphite forms a robust structure which holds the particles of salt from which ammonia has been discharged. In practice, therefore, the material does not dilate by the same factor as those stated in Table 1. Holes form in the core of the compacted material.

In particular, the salt can be previously intimately integrated with the additive introduced into the container, then compressed prior to being charged with ammonia.

One known technique for obtaining such a mixture consists of obtaining the bond between the storage phase and the additive via a methanol bath. This method, extrapolated to the scale of automobile mass production, proves to be complex and costly in investment, due to the involvement of an intermediary product, methanol in this case, and numerous additional manufacturing steps such as preparation of the methanol bath, creation of the thermodynamic conditions for mixing the two products in the desired proportion, drying the assembly and conditioning the matrix thus obtained.

Another approach makes it possible to obtain a mixture of the two phases of the composite matrix which is the salt and the additive, without resorting to an intermediary methanol bath. The mixture is thus formed under "dry" conditions. FIG. 3a shows a mixture of salt and powdered additive in a container. FIG. 3b shows a step consisting of compacting the mixture of salt and powdered expanded additive in the container. FIG. 3c shows the salt mixed with the additive saturated with ammonia. FIG. 3d shows the salt mixed with the additive after discharge of the ammonia. The mixture, however, is complex to produce because the two components do not share the same density. The use of a non-expanded material would make it possible to compensate for this shortcoming, but would cause a decrease in the quality of the storage matrix, particularly by reducing its thermal conductivity.

2) Structure Illustrating One Embodiment of the Invention

The storage structure described below has as its purpose to avoid the difficulties connected with storage in a structure consisting solely of salt or of salt mixed with an additive.

The ammonia storage structure includes at least one layer including a powdered salt suited for storing and discharging ammonia.

The ammonia storage structure also includes at least one layer made of a thermally conductive material so as to increase heat transfer within the structure.

It is thus possible to improve heat transfer within the storage structure.

The storage structure thus constitutes an ammonia storage structure including an alternation of at least one ammonia storage layer and at least one layer of a thermally conductive material. By alternation is meant one ammonia storage layer and one layer of thermally conductive material. Alternation thus means that the structure includes at least these two layers, or three stacked layers, or more.

In the case of three layers, the alternation can include a storage layer positioned between two layers of thermally conductive material, or one layer of thermally conductive material positioned between two storage layers.

In an ammonia storage structure including a plurality of storage layers and a plurality of layers of thermally conductive material, the layers of thermally conductive material can be intercalated between the storage layers or the storage layers can be intercalated between the layers of thermally conductive material.

Thus, the ammonia storage structure can for example include at least two layers including a powdered salt suited for storing and discharging ammonia. The at least two layers of powdered salt are separated from one another by at least one layer of a thermally conductive material so as to improve heat transfer within the structure. The thermally conductive material is a material having a higher thermal conductivity than that of the salt with which it is associated. Its presence in an intercalary layer makes it possible to increase heat transfer within the storage structure. Such a structure also corresponds to an alternation. By alternation is also meant a structure within which are found, in alternation, a greater number of storage layers and of layers of a thermally conductive material.

The powdered salt is selected from among the alkaline earth chlorides. In particular, the salt can consist of the following compounds: $SrCl_2$, $MgCl_2$, $BaCl_2$, $CaCl_2$, $NaCl_2$.

The layers of salt preferably contain grains of salt the grain size whereof is comprised between 1 and 1000 μm.

Preferably, the mass of the thermally conductive material constitutes between 1% and 30% of the mass of the salt.

The or each storage layer can be made of a compressed powdered salt, for example previously compressed or compressed while obtaining the storage structure. Alternatively, the storage layer can be made of a non-compressed powdered salt.

The or each storage layer can be a rigid element. By a rigid element is meant an element that can essentially not be deformed. Alternatively, the or each storage layer may not be a rigid element, for example a non-compressed powder of a salt or an element that is more easily deformable.

The height of all the layers made of a storage material is typically comprised between 25% and 75%, more preferably for example between 50% and 75%, of the height of all the layers made of a thermally conductive material, depending on the nature of the storage material and of the thermally conductive material.

In particular, the height of each layer made of a storage material is typically comprised between 25% and 75%, more preferably for example between 50% and 75%, of the height of each layer made of a thermally conductive material.

Such intervals are particularly suited to the case where the storage material includes an alkaline earth salt and where the thermally conductive material includes expanded natural graphite, in particular in the case where the alkaline earth salt is strontium chloride or barium chloride.

The thermally conductive material consists for example of a powder previously compressed to form the layer(s) made of thermally conductive material. Alternatively, the layers made of thermally conductive material consist for example of a non-compressed powder.

The layers made of thermally conductive material can form intercalary layers between which non-compressed salt powder is incorporated. Alternatively, the layers of salt can be formed from compressed or non-compressed rigid wafers.

The layers of salts can also include a mixture of powdered salt and an additive. The additive can be the thermally conductive material. In this embodiment, the increase in the thermal conductivity of the assembly is accomplished in part thanks to the intercalary layers and in part via the presence of additive within the layer designed for storage.

The number of intercalary layers of thermally conductive material is preferably comprised between 1 and 30.

The thermally conductive material can for example be expanded natural graphite compressed into intercalary layers. The thermally conductive material can include a metal powder, for example aluminum powder. The thermally conductive material can consist of metal in solid form.

The storage structure is or is designed to be positioned inside a container.

During operation of a system including this storage structure in a container, gaseous ammonia under pressure [is present] in the container.

When the storage structure is not saturated, salt grains of the at least one storage layer absorb the ammonia. It is thus possible to fill at least partially the at least one gas storage layer with this ammonia.

By heating the or each storage layer, it is later possible to obtain the release of the absorbed ammonia to extract it from the container.

The layers made of a storage material and the layers made of a thermally conductive material can have varying shapes, in particular sections of varying shapes.

The layers, for example, have substantially the same shape as the container wherein they are to be placed or are placed.

The layers can typically have a substantially cylindrical shape of round, oval, or rounded, or even rectangular or parallelepiped section.

3) Example Illustrating an Embodiment of the SCR Post-Treatment System

Figure 1:
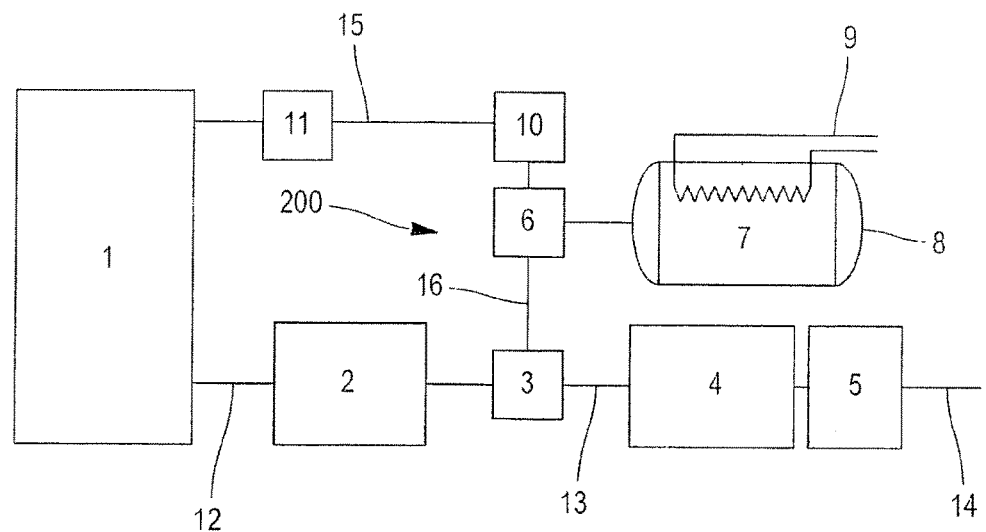
FIG. 1 shows a heat engine equipped with an SCR system for post-treatment by ammonia injection according to one embodiment of the invention.

A heat engine equipped with an SCR post-treatment system using ammonia injection is shown in FIG. 1. The heat engine can be an internal combustion engine, for example a diesel engine, or a lean mixture gasoline engine, such as a direct injection stratified charge engine.

An engine 1 is controlled by an electronic computer 11. Leaving the engine, exhaust gases 12 are led to a pollution control system 2. The pollution control system 2 can include an oxidation catalyst or a three-way catalyst. The pollution control system can also include a particulate filter.

Ammonia 16 is injected at an exhaust circuit 100 of the engine and mixed with the exhaust gases by means of an injection module 3 positioned for example downstream of the pollution control element 2 to create an ammonia/exhaust gas mixture 13. The ammonia/exhaust gas mixture then passes through an SCR catalyst 4 which allows reduction of the NOx by the ammonia. Supplementary post-treatment elements 5 can be positioned after the SCR catalyst. The supplementary elements 5 can include a particulate filter or an oxidation catalyst. The exhaust gases thus appear in the form of pollutant-free exhaust gases 14 leaving the supplementary elements 5. The pollutant-free exhaust gases are then led to an exhaust outlet 17. Thus the exhaust 100 includes, arranged from the upstream, engine 1 end, to the downstream, outlet 17 end, the pollution control element 2, the injection module 3, the SCR catalyst 4 and the supplementary elements 5.

To provide supply and metering of the ammonia 16 entering the injection module 3, the system includes an ammonia storage container 8 containing a storage structure 7 capable of being temperature-controlled by a heating or reheating device 9. The heating device 9 includes for example an electrical resistance element or a heat exchanger supplied by a heat-carrier fluid such as the engine coolant.

The heating device 9 makes it possible for example to supply heat directly to the interior of the container 8. Alternatively, the heating device 9 makes it possible for example to transmit heat from outside the container 8 to the interior of the container 8.

In particular, the heating device 9 makes it possible to supply heat to the storage structure 7.

The storage structure 7 includes at least two layers of powdered salt, the at least two layers of powdered salt being separated from one another by at least one layer made of thermally conductive material.

The layers of the storage structure 7 can have axial symmetry with the same axis. The structure 7 can then have a hollow along the axis of axial symmetry to allow storage and/or withdrawal of ammonia at each layer of salt.

The structure 7 can include channels for carrying ammonia from outside the container 8 to the layers of salt, and/or vice versa.

The heating device 9 can include several heating modules (not shown), each heating module being designed to heat a layer of salt independently of the other layers of salt.

The storage container 8 is connected to a device 6 for container pressure control and metering ammonia to the injection module 3. This device 6 can be controlled by a dedicated electronic controller 10 connected to the engine's electronic computer 11.

The system also includes an ammonia supply circuit 200 including, from upstream to downstream in the ammonia circulation direction, the storage container 8, the device 6 and the injection module 3 in the exhaust 100.

In an alternative configuration, not shown, the device 6 can be directly controlled by the engine computer 11.

4) Method for Producing the Structure

First Exemplary Embodiment

With reference to FIGS. 4a to 4h, a method for producing the storage structure 7 is described, described in the container 8 according to one exemplary embodiment.

In the initial state, shown in FIG. 4a, the container 8 is empty.

The container 8 has for example axial symmetry. The container 8 can then include a cylindrical outer wall 81 and an inner wall forming a tube 82 delimiting a central hollow extending along the axis of symmetry of the container 8.

With reference to FIG. 4b, the method includes a first step consisting of depositing a first layer of non-compressed powdered salt, for example in the annular region situated between the outer wall 81 of the container 8 and the wall of the tube 82.

With reference to FIGS. 4b and 4c, a second step is described, consisting of forming the first layer of salt using a plunger. This second step makes it possible to obtain homogeneous first layer of salt, typically with constant thickness, the surface form whereof is such that intimate contact is ensured with the layer of thermally conductive material that is formed next.

The first layer of salt thus exhibits axial symmetry, with the same axis as the container 8.

With reference to FIG. 4d, a third step is described consisting of depositing a first layer of a thermally conductive material 72 onto the first layer of salt 71. The thermally conductive material is for example made of a preformed block of expanded natural graphite.

The layer made of thermally conductive material 72 has for example the same symmetry properties as the container 8.

Figures 4E, 4F, 4G, 4H:
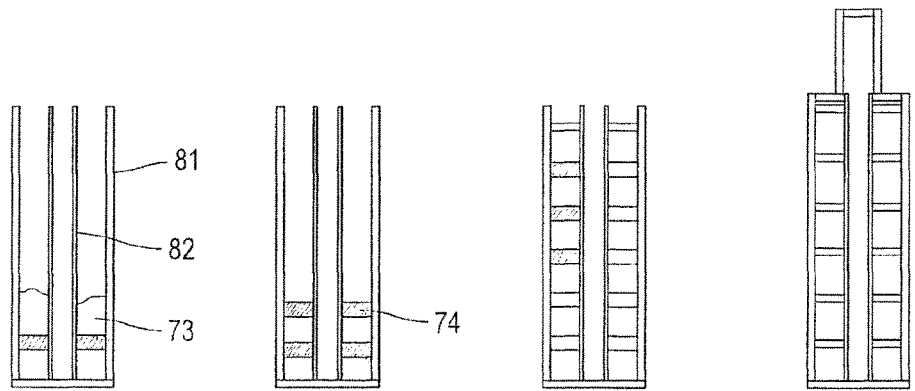

With reference to FIG. 4e, a fourth step is described, consisting of depositing a second layer of un-compressed powdered salt 73 onto the first layer made of a thermally conductive material 72.

FIG. 4f shows the container 8 after deposition of a second layer made of a thermally conductive material 74.

As illustrated in FIG. 4g, the first three steps of the method can be repeated up to thirty times to obtain a stratified storage structure 7.

It should be noted that it is possible to produce either layers of pure storage salt, or layers of salt mixed, in a given ratio, with an additive.

Second Exemplary Embodiment

Moreover, rigid wafers of salt can be prepared in advance by compression or by using a binder.

Implantation of the layers of salt and of expanded natural graphite is then carried out by successive stacking of rigid wafers.

It is thus possible to obtain rigid wafers constituting a layer made of a storage material.

One method for producing the storage structure described in the container 8 according to another exemplary embodiment using such rigid wafers is described here.

In the initial state, the container 8 is empty.

The container 8 exhibits, for example, axial symmetry. The container 8 can then include a cylindrical outer wall 81 and an inner wall forming a tube 82 delimiting a central hollow extending along the axis of symmetry of the container 8.

The method includes a first step consisting of depositing a first layer made of a storage material. The first layer is typically a rigid wafer of compressed powdered salt. The first layer made of a storage material is typically deposited in an annular region situated between the outer wall 81 of the container 8 and the wall of the tube 82.

The method includes a second step consisting of depositing a first layer made of a thermally conductive material onto the first layer made of a storage material. The thermally conductive material is for example a stratum of expanded natural graphite.

The layer made of thermally conductive material exhibits for example the same axial symmetry properties as the container 8.

The method includes a third step consisting of depositing a second layer made of a storage material similar to that of the first step, onto the first layer made of a thermally conductive material.

The first two steps of the method can be repeated up to thirty times to obtain a stratified storage structure 7.

Third Exemplary Embodiment

According to one possible variant of the method described previously using rigid wafers, some of the layers can be preassembled outside of the container 8.

One method for producing the storage structure 7 described, according to a third exemplary embodiment using such rigid wafers, is described here.

The method includes a first step consisting of supplying a first layer made of a storage material and a first layer made of a thermally conductive material.

The first layer is typically a rigid wafer of compressed powdered salt. The thermally conductive material is for example a stratum of expanded natural graphite.

The method includes a second step consisting of preassembling the first layer made of a storage material with the first layer made of a thermally conductive material.

By preassembly is meant assembly, typically partial assembly, carried out upstream of placement in the previously describe container, so that the layers are firmly bonded together.

The layers, or given groups of layers, are for example preassembled together by means of an adhesive. Alternatively or in complementary fashion, the layers are for example assembled by compression of the layers against one another so that they adhere to one another and/or so that they interpenetrate in the vicinity of their interface.

The method can then include one or more successive third steps consisting of bonded preassembly of one or more layers made of a storage material and/or of one or more layers made of a thermally conductive material operations to the preassembly obtained in the preceding steps to form a preassembly exhibiting an alternation as previously described.

The method can include a fourth step consisting of producing a storage structure within a container according to one of the methods describe previously, also including a step consisting of depositing the preassembly thus typically formed outside the container, as a part of the storage structure being formed.

What is meant by formed outside the container is that the preassembly steps were performed outside the container.

Such preassembly facilitates subsequent assembly of the storage structure inside the storage container.

Moreover, such a preassembly allows standardization of the preassemblies as elements of the matrix to be assembled to form the structure inside the container. It is thus possible to obtain storage structures with more homogeneous and hence more predictable properties, which allows better control during their subsequent use. In particular, it is possible to associate a matched heat conduction block with a storage salt block, thus optimizing operating conditions in each of the preassembled groups.

There also results from it a simplification of the logistics associated with transporting the constitutive elements of the storage structure to their assembly site.

Ammonia Saturation

Preferably, during the production procedures, typically the production procedures describe previously, the or each storage layer and the or each layer of thermally conductive material are assembled or formed in the container to obtain the storage structure, in the absence of ammonia.

According to a preferred embodiment, the salt layers do not contain ammonia during the steps described previously.

The method can therefore include a step, subsequent to the previous steps, wherein the storage structure thus formed is saturated, at least partially, with ammonia.

Preferably, the or each storage layer and the or each layer of thermally conductive material are formed and assembled in such a manner that clearance remains between the or each layer of thermally conductive material and the inner face of the wall of the container.

FIG. 4h shows a complete storage structure 7 saturated with ammonia, in a closed container 8, during operation.

5) Storage Structure Having Clearance

During a step consisting of filling or saturating the storage structure with ammonia, the or each storage layer swells and its volume increases. Such a phenomenon is shown particularly in FIG. 4h.

The or each layer of thermally conductive material can be produced so as to be elastically deformable. It can thus for example be made of expanded, pre-compressed natural graphite.

Thus, during filling with ammonia, the or each storage layer increases in volume and the at least one layer made of thermally conductive material undergoes forces that deform it.

The structure and the container can in particular be dimensioned so that this deformation does not involve any significant change in density of the or each layer of thermally conductive material, as long as the free space in the container allows a change of shape at constant density.

When clearance exists between the inner wall of the container and the or each layer made of a thermally conductive material, the latter can thus deform so as to occupy a peripheral volume resulting from the clearance.

The or each layer of thermally conductive material can thus deform until it comes into contact with the inner wall of the container in the clearance zone, for example the peripheral wall. This makes it possible in particular to guarantee satisfactory circulation of the heat contributed by the heating device to the or each layer of thermally conductive material.

In one particular embodiment, the thickness of the or each layer made of a thermally conductive material can decrease and its diameter increase without change of density, that is without change the total volume occupied by the layer.

The structure can be dimensioned such that, when the entire volume of the interior of the container is occupied by the storage structure, that is when there is no longer any free volume of the container accessible to any layer of a thermally conductive material, the or each storage layer is not yet saturated with ammonia. Continuing filling of the or each storage layer involves an additional increase in volume of the or of each storage layer. This volume increase is then at least partially compensated and/or the resulting forces at least partially absorbed by compression of the or of each [layer] of thermally conductive material, the density whereof then increases.

For example, the expanded natural graphite in the natural state has a density that is about a hundred times than non-porous, non-expanded graphite. If the at least one layer made of a thermally conductive material is made of pre-compressed expanded natural graphite, for example in the form of a rigid wafer, the or each layer of thermally conductive material can have a density ten times greater than non-porous, non-expanded graphite. Its theoretical compression capacity is therefore a factor of ten.

Thus the storage structure can be produced in such a manner that the different layers are held in mutual contact even when the structure is not saturated, or is even almost drained of ammonia. The result is better thermal conductivity. Moreover, the fact that the elements of the structure are held avoids having them move and suffering predictable wear due to rubbing and mechanical shocks.

Such a storage structure has nevertheless the advantage of limiting the forces sustained by the container within which the storage structure is placed. Indeed, the forces resulting from the increase in volume of the or of each storage layer are absorbed by the or each layer of thermally conductive material, which changes shape at constant density as long as a clearance space can be occupied, then is compressed, with an increase in density, once all accessible clearance space is occupied.

According to one exemplary embodiment, the layers of the storage structure can consist of a stack of alternating disks, or wafers. The container can have a generally cylindrical or conical shape, or one with any cross-section, for example square or oval. The container can have a general shape that is perforated end to end along a given axis. In the case of a conical container or one with a variable cross-section, the wafers have diameters with variable dimensions.

In such an example of a structure having a stack of disks, the structure can have an alternation of at least one disk constituting a storage layer and at least one disk constituting a layer of a thermally conductive material. The disks can be designed in such a manner that the thickness of the empty storage layer is at least twice as great as the thickness of an adjoining layer of thermally conductive material, in the empty state.

In addition, the disks can be designed in such a manner that the clearance between the edge of the layer of thermally conductive material and the inner face of the wall of the container which contains the storage structure, that is the space on either side of the layer, is comprised between 2% and 30%, more preferably between for example 5% and 16%, of the transverse diameter of the layer (or the equivalent principal length in the case of a structure with a particular contour) when the storage structure is drained of ammonia.

Within such intervals, it is thus possible to obtain a true force-limiting effect thanks to a substantial clearance, the layer of thermally conductive material retaining its ability to hold the layers of the storage structure in mutual contact.

6) Example of a Method of Obtaining a Storage Structure Exhibiting Clearance

According to a first step, layers of a thermally conductive material are prepared. A prior step consisting of compression to given dimensions, in particular to a given thickness and/or to a given section, can allow such layers to be provided with a desired density.

According to a second step, layers of storage material are prepared. These layers can be prepared by compression of a powder including a powdered salt as described previously. This compression can be performed so as to obtain layers with given dimensions, having in particular a given thickness and/or a given section.

According to a third step, the layers of storage material and the layers of thermally conductive material are placed inside the container so as to form the storage structure in the form of a stack exhibiting an alternation of these layers. Alternatively, layers or groups of layers can be alternately stacked outside the container, the layers adhering to one another to form one or more self-supporting bonded assemblies. This or these assemblies are then placed inside the container.

Figure 5:
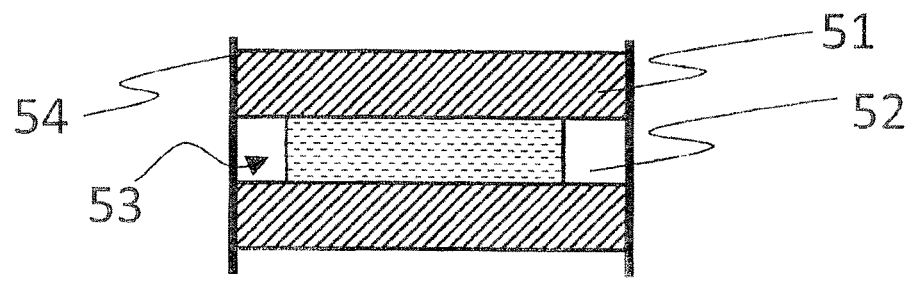
FIG. 5 shows a portion of a storage structure having a clearance, Table 1 showing the theoretical expansion ratio of ammoniate complexes.

With reference to FIG. 5, a portion of the storage structure is described wherein each layer of thermally conductive material 52 is dimensioned with respect to the container so as to exhibit clearance 53 between said layer and the wall 54 of the container when the structure is not saturated with ammonia, so that an increase in the volume of an adjoining storage layer 51 during filling with ammonia is compensated, in an initial filling phase, by a change in the shape of the thermally conductive material 52 to occupy free space resulting from the clearance. Thereafter, the layer of thermally conductive material can, as the case may be, compress to absorb a further volume increase. The layer of thermally conductive material, in intimate contact both with the wall of the container and with the layer of storage material, provides excellent heat transfer.

Of course, the present invention is in no way limited to the embodiments described and shown, and a person skilled in the art will know how to apply numerous variants and modifications to it using his general knowledge.

The invention claimed is:

1. An ammonia storage structure, wherein the ammonia storage structure comprises:
   at least two ammonia storage layers, and
   at least one layer of a thermally conductive material with a greater thermal conductivity than that of the at least two ammonia storage layers, the at least one layer of thermally conductive material being designed to increase heat transfer within the ammonia storage structure,
   wherein each of the at least two ammonia storage layers is disposed adjacent to and separate from a corresponding one of the at least one thermally conductive material layers, and each of said at least one thermally conductive material layers is disposed between a corresponding pair of said at least two ammonia storage layers.

2. The ammonia storage structure according to claim 1, wherein the at least two ammonia storage layers includes a powdered salt.

3. The ammonia storage structure according to claim 1, wherein the at least one layer of thermally conductive material includes a previously compressed powder.

4. The ammonia storage structure according to claim 1, wherein at least one of the at least two ammonia storage layers is a rigid wafer, compressed or not compressed.

5. The ammonia storage structure according to claim 1, wherein the at least one layer of thermally conductive material comprises between 1 and 30 layers.

6. The ammonia storage structure according to claim 1, including at least one layer formed by one of the at least two ammonia storage layers and the at least one layer of a thermally conductive material is mechanically independent of an adjoining layer or other layers of the at least two ammonia storage layers and the at least one layer of a thermally conductive material.

7. A system for storing and discharging ammonia for a vehicle, including a storage container, wherein the storage container includes an ammonia storage structure, wherein the ammonia storage structure includes, in alternation:
    at least two ammonia storage layers, and
    at least one layer of a thermally conductive material with a greater thermal conductivity than that of the at least two ammonia storage layers, the at least one layer of thermally conductive material being designed to increase heat transfer within the ammonia storage structure,
        wherein each of the at least two ammonia storage layers is disposed adjacent to and separate from a corresponding one of the at least one thermally conductive material layers, and each of said at least one thermally conductive material layers is disposed between a corresponding pair of said ammonia storage layers.

8. The storage system according to claim 7, wherein the at least one layer of thermally conductive material is dimensioned with respect to the storage container so as to exhibit clearance between said at least one layer of thermally conductive material and a wall of the storage container when the ammonia storage structure is not saturated with ammonia, so that an increase in a volume of the at least two ammonia storage layers due to ammonia storage is compensated, in an initial filling phase, by a change in a shape of the at least one layer of thermally conductive material so as to occupy free space resulting from the clearance.

9. The storage system according to claim 8, wherein the clearance is situated between a sidewall of the storage container and a sidewall of the at least one layer of thermally conductive material.

10. The storage system according to claim 9, wherein the clearance comprises between 2% and 30% of a transverse diameter of the at least one layer of thermally conductive material.

11. The storage system according to claim 7, wherein the ammonia storage structure is produced in such a way that the at least one layer of thermally conductive material is capable of compressing in a final filling phase.

12. The storage system according to claim 7, wherein each layer of the at least two ammonia storage layers and the at least one layer of a thermally conductive material generally extends, in a given filling condition, over an entire extent of a cross-section of the storage container.

13. The storage system according to claim 7, wherein the ammonia storage structure exhibits a hollow along an axis of axial symmetry to allow storage and/or withdrawal of ammonia at each of the at least two ammonia storage layers.

14. The storage system according to claim 7, wherein the storage system includes at least one storage structure heater for withdrawing ammonia stored in the ammonia storage structure, each said storage structure heater configured to heat a corresponding one of the at least two ammonia storage layers independently of any other ammonia storage layer.

15. The storage system according to claim 7, wherein the ammonia storage structure includes channels for transporting ammonia from outside the storage container to the at least two ammonia storage layers, and vice versa.

16. A selective catalytic reduction system for internal combustion engine exhaust gases, wherein the selective catalytic reduction system includes an ammonia storage system according to claim 7 and an injector for injecting ammonia into the exhaust gases.

17. A method for obtaining an ammonia storage structure, wherein the ammonia storage structure includes:
    at least one ammonia storage layer, and
    at least one layer of a thermally conductive material with a greater thermal conductivity than that of the at least one ammonia storage layer, the at least one layer of thermally conductive material being designed to increase heat transfer within the ammonia storage structure,
    wherein each of the at least one ammonia layers is disposed adjacent to and separate from a corresponding one of the at least one thermally conductive material layers,
the method including:
    depositing one of the at least one ammonia storage layers as at least one of a non-compressed salt and a previously compressed salt,
    depositing one of the at least one layer of thermally conductive material as a previously compressed powder,
    repeating the deposition steps to form an alternation of said at least one ammonia storage layer and at least one intercalary layer of said thermally conductive material,
    wherein each of the deposition steps are accomplished within a storage container.

18. The method according to claim 17, wherein a first ammonia storage layer of salt is powdered, the method including introducing the powdered salt into the storage container and shaping the powdered salt using a plunger.

19. A system for storing and discharging ammonia for a vehicle, including a storage container, wherein the storage container includes an ammonia storage structure, wherein the ammonia storage structure includes, in alternation:
    at least one ammonia storage layer, and
    at least one layer of a thermally conductive material with a greater thermal conductivity than that of the at least one ammonia storage layer, the at least one layer of thermally conductive material being designed to increase heat transfer within the ammonia storage structure,
    wherein the storage system includes a storage structure heater for withdrawing ammonia stored in the ammonia storage structure, the storage structure heater including at least one heater, each said heater being designed to heat one of the at least one ammonia storage layers independently of any other ammonia storage layer.

20. The storage system according to claim 19, wherein the at least one layer of thermally conductive material is dimensioned with respect to the storage container so as to exhibit clearance between said at least one layer of thermally conductive material and a wall of the storage container when the ammonia storage structure is not saturated with ammonia, so that an increase in a volume of the at least one ammonia storage layer due to ammonia storage is compensated, in an initial filling phase, by a change in a shape of the at least one layer of thermally conductive material so as to occupy free space resulting from the clearance.

21. The storage system according to claim 20, wherein the clearance is situated between a sidewall of the storage container and a sidewall of the at least one layer of thermally conductive material.

22. The storage system according to claim 21, wherein the clearance comprises between 2% and 30% of a transverse diameter of the layer of thermally conductive material.

23. The storage system according to claim 19, wherein the ammonia storage structure is produced in such a way that the at least one layer of thermally conductive material is capable of compressing in a final filling phase.

24. The storage system according to claim 19, wherein each layer of the at least one ammonia storage layer and the at least one layer of a thermally conductive material generally extends, in a given filling condition, over an entire extent of a cross-section of the storage container.

25. The storage system according to claim 19, wherein the ammonia storage structure exhibits a hollow along an axis of axial symmetry to allow storage and/or withdrawal of ammonia at each of the at least one ammonia storage layers.

26. The storage system according to claim 19, wherein the ammonia storage structure includes channels for transporting ammonia from outside the storage container to the at least one ammonia storage layer, and vice versa.

27. A selective catalytic reduction system for internal combustion engine exhaust gases, wherein the selective catalytic reduction system includes an ammonia storage system according to claim 19 and an injector for injecting ammonia into the exhaust gases.

28. An ammonia storage structure, wherein the ammonia storage structure includes, in alternation:
   at least one ammonia storage layer, and
   at least one layer of a thermally conductive material with a greater thermal conductivity than that of the at least one ammonia storage layer, the at least one layer of thermally conductive material being designed to increase heat transfer within the ammonia storage structure,
   wherein the at least one layer of thermally conductive material includes a previously compressed powder.

29. The ammonia storage structure according to claim 28, wherein the at least one ammonia storage layer includes a powdered salt.

30. The ammonia storage structure according to claim 28, wherein at least one of the at least one ammonia storage layers is a rigid wafer, compressed or not compressed.

31. The ammonia storage structure according to claim 28, wherein the at least one layer of thermally conductive material comprises between 1 and 30 layers.

32. The ammonia storage structure according to claim 28, including at least one layer of the at least one ammonia storage layer and the at least one layer of a thermally conductive material is mechanically independent of an adjoining layer or other layers of the at least one ammonia storage layer and the at least one layer of a thermally conductive material.

33. The ammonia storage structure according to claim 28, wherein each of the at least one ammonia layers is disposed adjacent to and separate from a corresponding one of the at least one thermally conductive material layers.

34. A method for obtaining an ammonia storage structure for a storage container, wherein the ammonia storage structure includes:
   at least one ammonia storage layer, and
   at least one layer of a thermally conductive material with a greater thermal conductivity than that of the at least one ammonia storage layer, the at least one layer of thermally conductive material being designed to increase heat transfer within the ammonia storage structure,
   wherein each of the at least one ammonia layers is disposed adjacent to and separate from a corresponding one of the at least one thermally conductive material layers,
   the method including:
   depositing one of the at least one ammonia storage layers as at least one of a non-compressed salt and a previously compressed salt,
   depositing one of the at least one layer of thermally conductive material as a previously compressed powder,
   repeating the deposition steps to form an alternation of said at least one ammonia storage layer and at least one intercalary layer of said thermally conductive material,
   wherein each of the deposition steps are accomplished within a same storage container,
   wherein each of the deposition steps are pre-assembled external to the storage container.

35. The method according to claim 34, wherein the one ammonia storage layer and the one layer of a thermally conductive material are pre-assembled external to said storage container, the one ammonia storage layer and the one layer of a thermally conductive material then being deposited simultaneously into the storage container.

36. The method according to claim 35, wherein the one ammonia storage layer and the one layer of a thermally conductive material are pre-assembled by gluing and/or compression of the one ammonia storage layer and the one layer of a thermally conductive material against one another.

* * * * *